US011231397B2

(12) United States Patent
Safai

(10) Patent No.: US 11,231,397 B2
(45) Date of Patent: Jan. 25, 2022

(54) REMOTE WIDE BANDWIDTH ULTRASONIC INSPECTION METHOD AND APPARATUS

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 333 days.

(21) Appl. No.: 16/522,752

(22) Filed: Jul. 26, 2019

(65) Prior Publication Data
US 2021/0025853 A1    Jan. 28, 2021

(51) Int. Cl.
*G01N 29/24* (2006.01)

(52) U.S. Cl.
CPC ..... *G01N 29/2437* (2013.01); *G01N 29/2418* (2013.01); *G01N 29/2462* (2013.01); *G01N 29/2475* (2013.01); *G01N 2291/0231* (2013.01); *G01N 2291/0234* (2013.01); *G01N 2291/0237* (2013.01)

(58) Field of Classification Search
CPC .......... G01N 29/2437; G01N 29/2418; G01N 29/2462; G01N 29/2475; G01N 2291/0231; G01N 2291/0234; G01N 2291/0237
USPC ......................................................... 73/632
See application file for complete search history.

(56) References Cited

U.S. PATENT DOCUMENTS

| | | | | |
|---|---|---|---|---|
| 4,928,527 A * | 5/1990 | Burger | ............... | G01N 29/2418 73/657 |
| 5,257,544 A * | 11/1993 | Khuri-Yakub | ......... | G01H 13/00 73/579 |
| 5,591,914 A * | 1/1997 | White | ...................... | G01D 5/48 331/155 |
| 6,370,964 B1 * | 4/2002 | Chang | ...................... | G01B 5/30 73/862.046 |
| 6,826,982 B2 * | 12/2004 | O'Brien | .................. | G01M 7/00 73/587 |
| 6,883,362 B2 * | 4/2005 | Ogawa | ................... | A61B 8/587 348/E17.005 |
| 7,536,911 B2 * | 5/2009 | Kim | ..................... | G01M 5/0033 250/227.18 |
| 2004/0065154 A1 * | 4/2004 | Kibblewhite | .......... | F16B 31/02 73/761 |
| 2004/0163478 A1 * | 8/2004 | Xu | ...................... | G01N 29/2475 73/763 |
| 2006/0071668 A1 * | 4/2006 | Senibi | ................. | G01N 29/041 324/537 |
| 2014/0230556 A1 * | 8/2014 | Yamamoto | ......... | G01N 29/4427 73/602 |
| 2018/0120269 A1 * | 5/2018 | Sinha | .................... | G01N 29/343 |

* cited by examiner

*Primary Examiner* — Lisa M Caputo
*Assistant Examiner* — Rose M Miller
(74) *Attorney, Agent, or Firm* — Coats & Bennett, PLLC

(57) ABSTRACT

Methods, systems, and apparatuses are disclosed for non-destructively inspecting a substrate by measuring the Doppler effect in sound waves comprising wide bandwidth ultrasound wavelengths generated from a piezoelectric polymer coating material with the sound waves read by a laser in communication with a Doppler velocity meter.

21 Claims, 8 Drawing Sheets

REMOTE WIDE BANDWIDTH ULTRASONIC INSPECTION METHOD AND APPARATUS

TECHNOLOGICAL FIELD

The present disclosure relates generally to the field of non-destructive inspection techniques. More specifically, the present disclosure relates to the field of non-destructively inspecting a substrate by detecting ultrasound wavelengths.

BACKGROUND

Presently, regulatory guidelines relating to the inspection of bonded composite materials in certain industries mandate the use of testing techniques that destroy the material being tested. This can result in significant expense, as large structures that contain composite parts, such as, for example, aircraft and other vehicles, must be taken out of service, destructively inspected, and then reworked before the aircraft can be placed back into service.

Non-destructive inspection systems for evaluating substrates have found utility in industry, for example, where access to various components and substrate materials requiring routine service and inspection may be difficult to access without significant labor or without partially, or completely, destroying the component or substrate material. For a non-destructive testing method or system to supplant the mandatory destructive methods presently in use, a non-destructive testing method must insure consistently reliable and repeatable analysis of an inspected object's surface or subsurface that at least equals or exceeds the physical determinations made during destructive testing.

There have been limiting drawbacks to the use of ultrasonic non-destructive testing methods and systems, including systems for generating ultrasonic energy, as such systems have required the presence of both a transducer and a receiver (to receive the ultrasonic energy signals from the transducer). as the receivers are typically located proximate to the piezoelectric transducer. Further drawbacks include the requirement of producing a high amplitude signal to obtain a readable signal, that further limits and narrows the operable and detectable ultrasonic bandwidth.

Further drawbacks have included the difficulty that arises in attempting to locate and install a required number of suitably situated transducers and receivers throughout a substrate, such as, for example a substrate in a structure requiring periodic or consistent quality monitoring; especially substrates oriented in locations that are difficult to access (e.g., pipes located in pipelines, etc.) and/or substrates on structures that occupy a large area, and/or substrates that include regions that are difficult to access, etc. (e.g., internal regions of vehicles, etc. including aircraft, etc., internal structures in buildings, bridges, etc.).

In addition, complex or exceedingly large substrates, including substrates with complex geometries can impede or adversely impact sound wave propagation, such that the optimal placement of receivers (for receiving of the sound waves generated by transducers) is difficult to determine. If the surface geometry of a substrate adversely impacts the desired placement of receivers (and/or transducers), further components such as couplers or amplifiers may be required to direct or boost the sound waves, further adding to system complexity, including the overall weight of the components used in such ultrasonic systems.

SUMMARY

According to present aspect, the present application discloses a method for non-destructively inspecting a substrate including measuring the Doppler effect in response to applied ultrasonic forces by applying a piezoelectric polymer coating to a substrate, orienting at least one electrode in communication with the piezoelectric polymer coating, applying a current from a power source (e.g., an electrical source, etc.) to the electrode, and generating a wide bandwidth ultrasound wavelength from the piezoelectric polymer coating. The method further includes transmitting a read beam from a laser, with the laser positioned remotely at a predetermined distance away from the substrate, and wherein the read beam engages the wide bandwidth ultrasound wavelength. The method further includes reflecting the read beam from the substrate to form a reflected read beam, receiving the reflected read beam at a receiver, with the receiver configured to be in communication with the laser, and wherein the reflected read beam comprises a reflected beam signal, interpreting the reflected read beam by generating a read beam signal from the receiver; and determining characteristics of the substrate based upon the read beam signal.

In another aspect, the receiver comprises a Doppler velocity meter.

In a further aspect, a presently disclosed method further includes non-destructively determining the presence of anomalies in the substrate by comparing a known wide bandwidth ultrasound wavelength to a wide bandwidth ultrasound signal read by the read beam and received by the receiver and measuring the Doppler effect.

In another aspect, the piezoelectric polymer comprises at least one of: lead zirconate titanate; polyvinylidene fluoride; polyimide; polyvinylidene chloride; potassium niobate; sodium tungstate; or combinations thereof.

In another aspect, a method further includes embedding a plurality of electrodes in the piezoelectric polymer coating.

In a further aspect, a method further includes applying a plurality of electrodes to the surface of the substrate, with the plurality of electrodes in communication with the piezoelectric polymer coating.

In another aspect, in the step of orienting at least one electrode in communication with the piezoelectric polymer material, the method further includes embedding a plurality of electrodes in the surface of the substrate.

According to a further aspect the substrate comprises at least one of: a composite material; a metallic material, a non-metallic material; or combinations thereof.

In another aspect, the receiver is located remotely from a surface of the substrate.

in a further aspect, the receiver is incorporated into an apparatus comprising the laser.

According to further aspects, a system for non-destructively inspecting a material is presently disclosed, with the system including a substrate having a substrate surface, a piezoelectric polymer coating on the substrate surface, at least one electrode in communication with the piezoelectric polymer coating, a power source in communication with the at least one electrode, and a laser (with the term "laser" equivalently referred to herein and "laser assembly") located a predetermined distance from the substrate.

According to a present aspect, the laser includes, a laser energy source, a laser emitting area for emitting a beam, with the said beam directed to the substrate, and a receiver for receiving a reflected beam from the substrate.

In another aspect, the laser comprises at least one of: a He—Ne laser; an argon laser; a laser diode laser; or combinations thereof.

In another aspect, the laser is configured to detect wide bandwidth ultrasound wavelengths from the substrate.

In a further aspect, a Doppler velocity meter is incorporated into the system to detect signals emitted from the piezoelectric polymer material.

In a further aspect, the laser comprises a receiver configured to receive a laser read beam that detects wide bandwidth ultrasound wavelengths, with the receiver further configured to be located remotely at a predetermined distance away from the substrate.

In another aspect, the receiver sends a signal from the receiver, and wherein the system interprets the signal sent from the receiver for the purpose of non-destructively detecting an anomaly in the substrate.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 2:
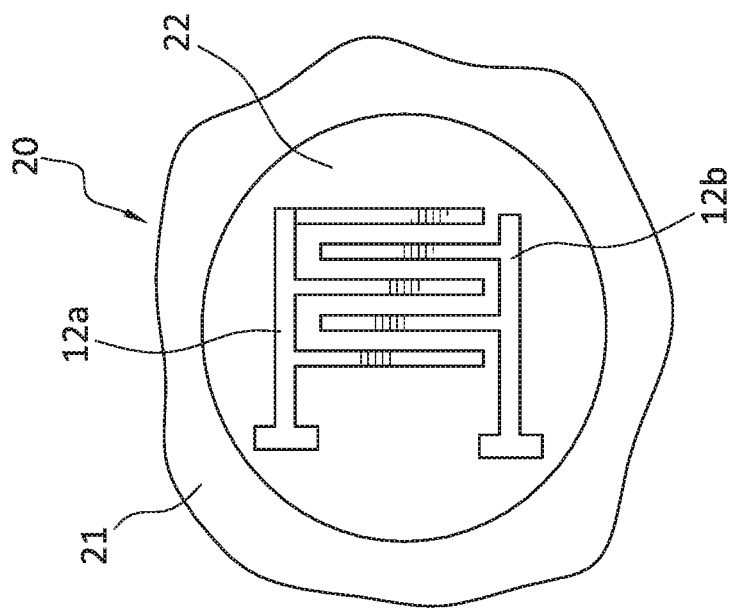
Figure 1:
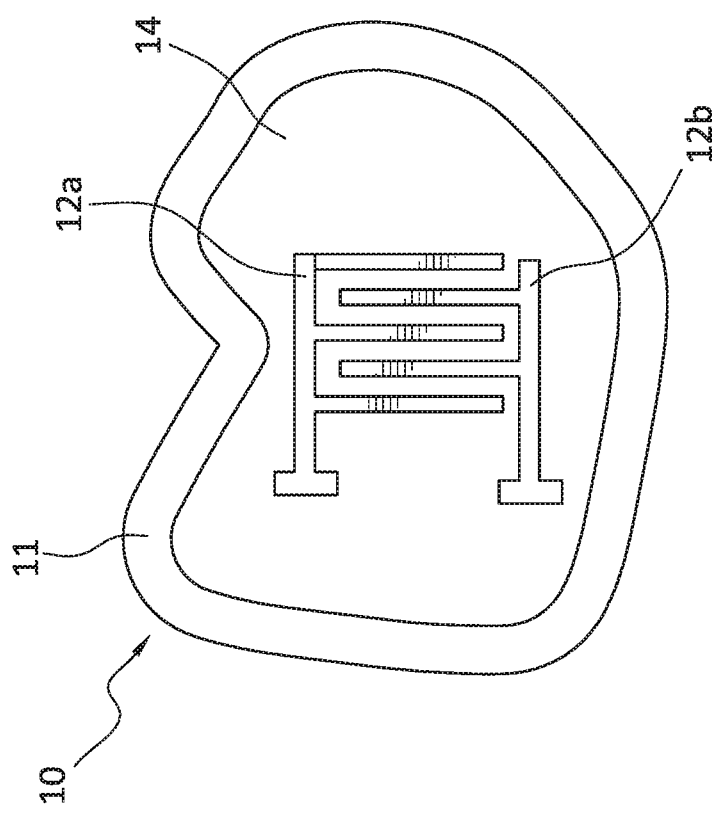
Figure 3:
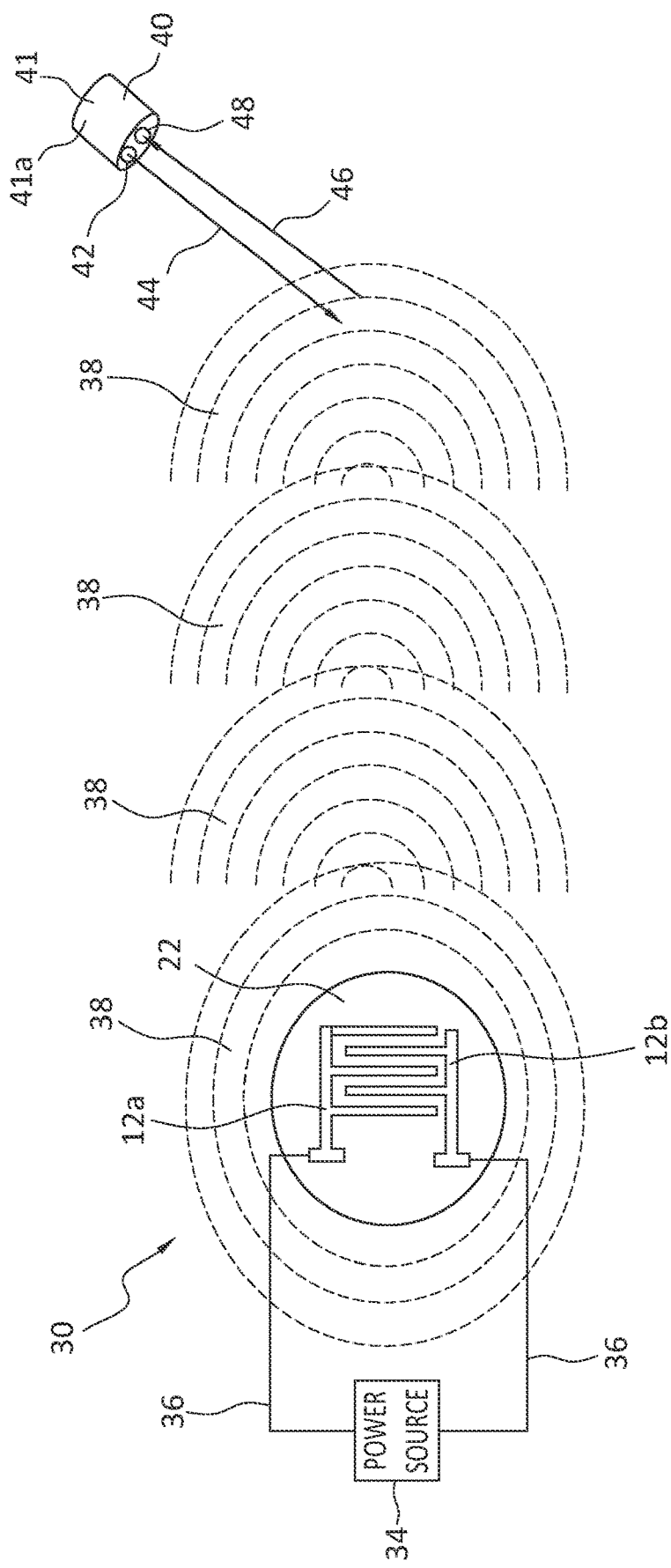
Figure 4:
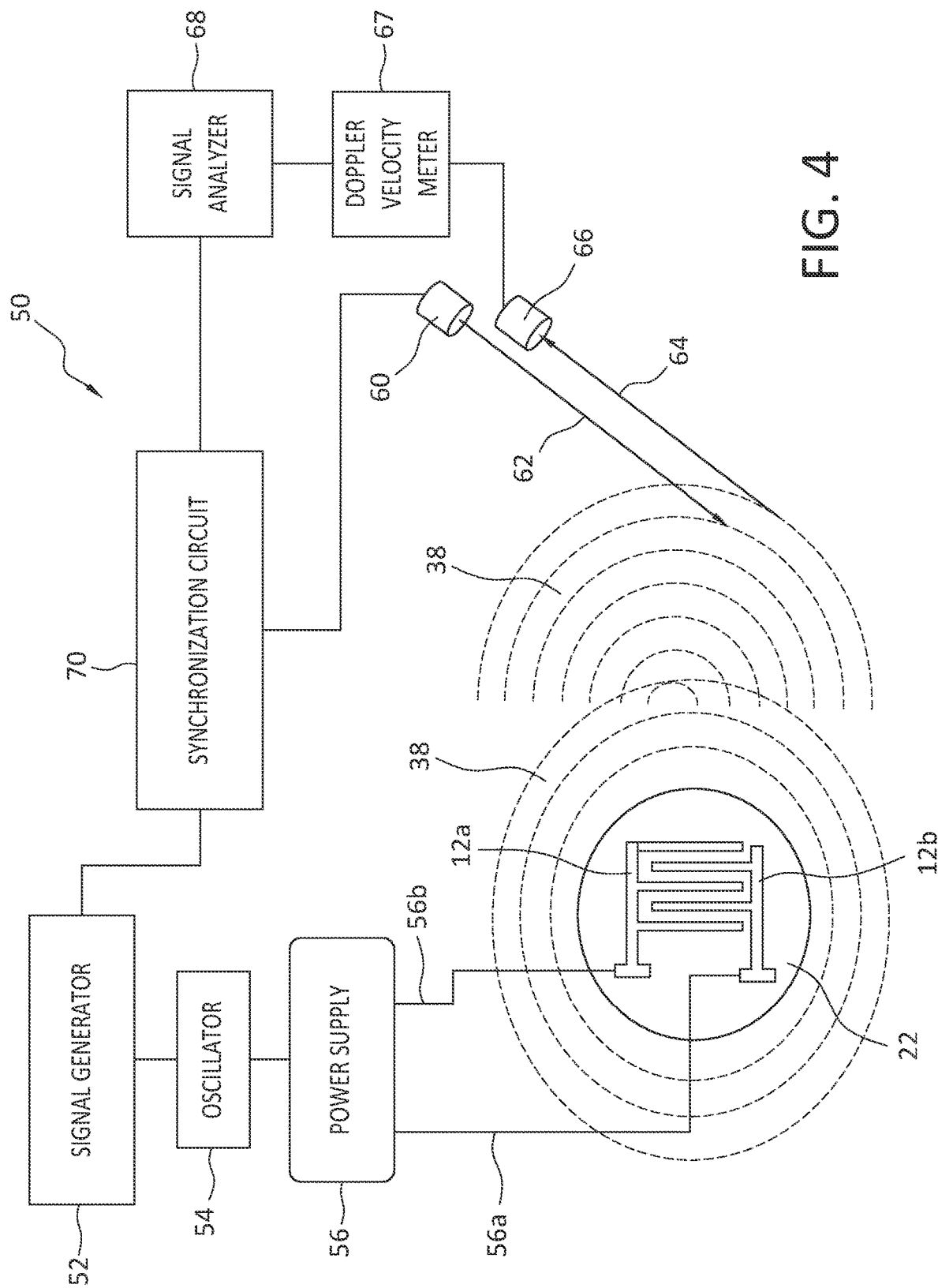
Figure 5:
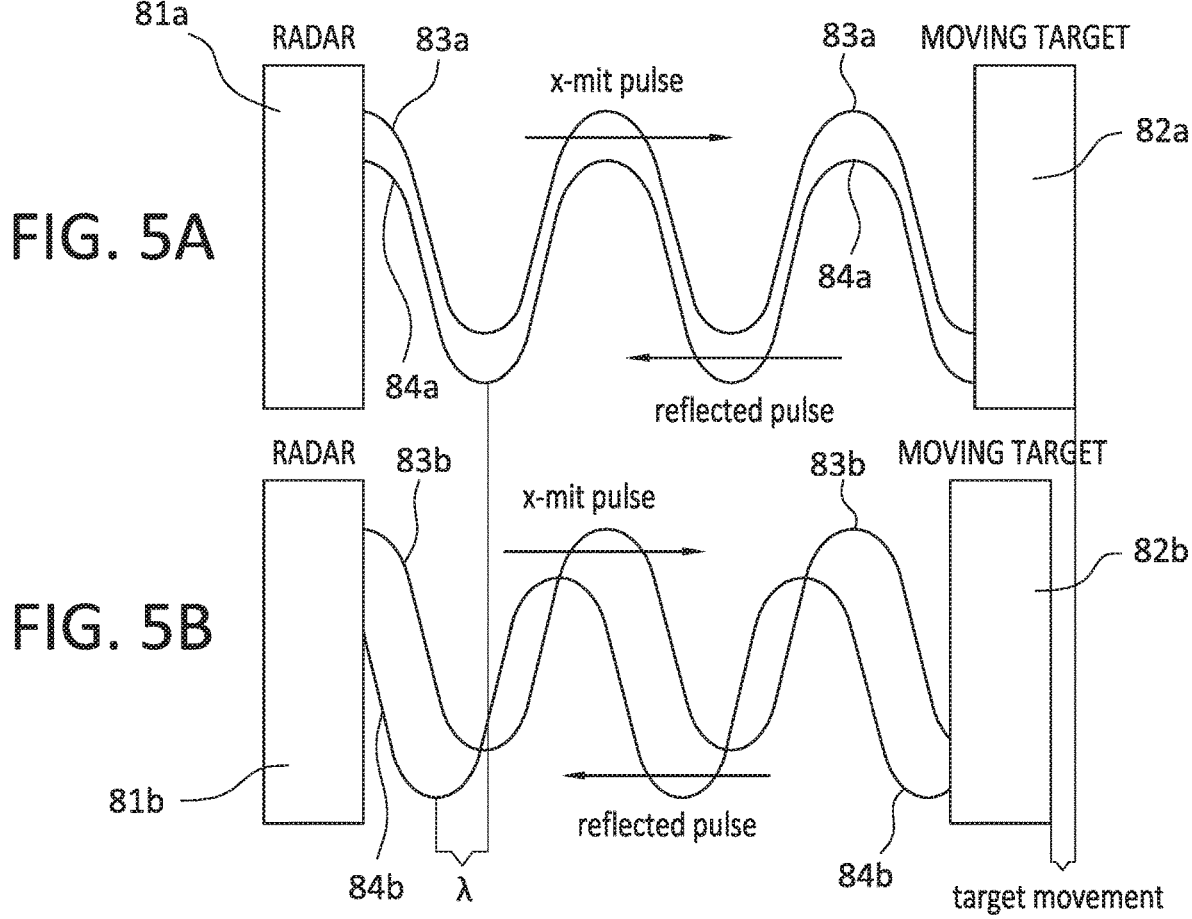
Figure 6:
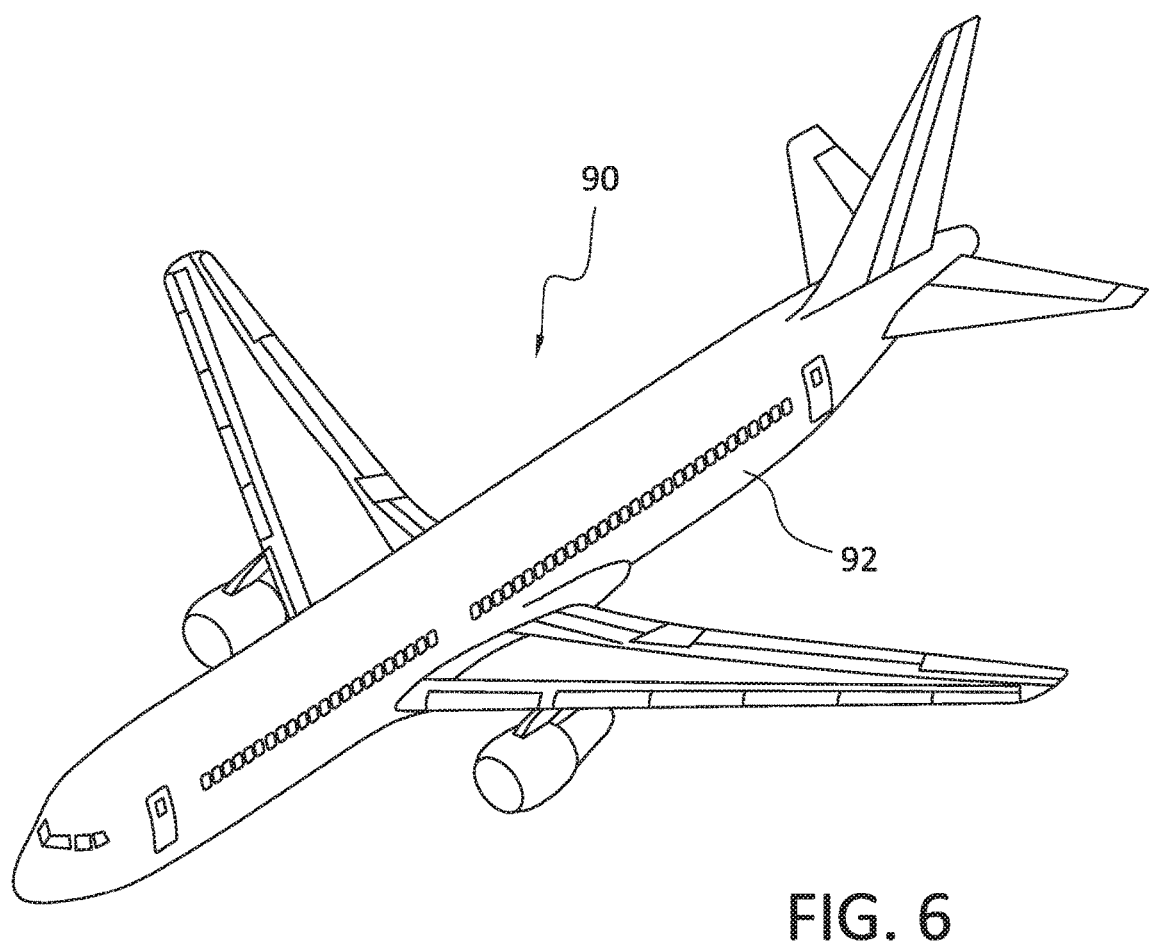
Figure 7:
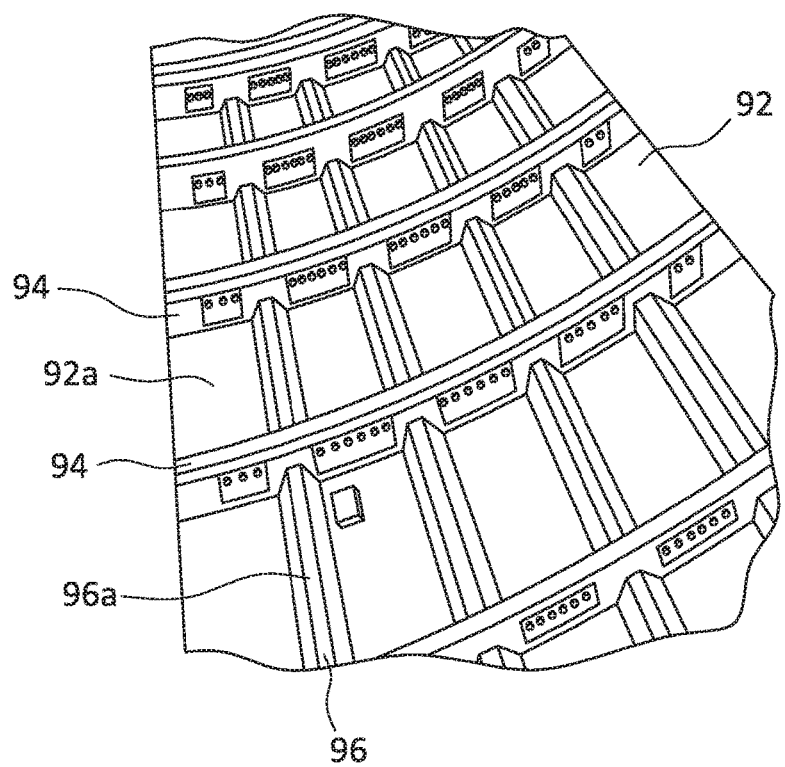
Figure 8:
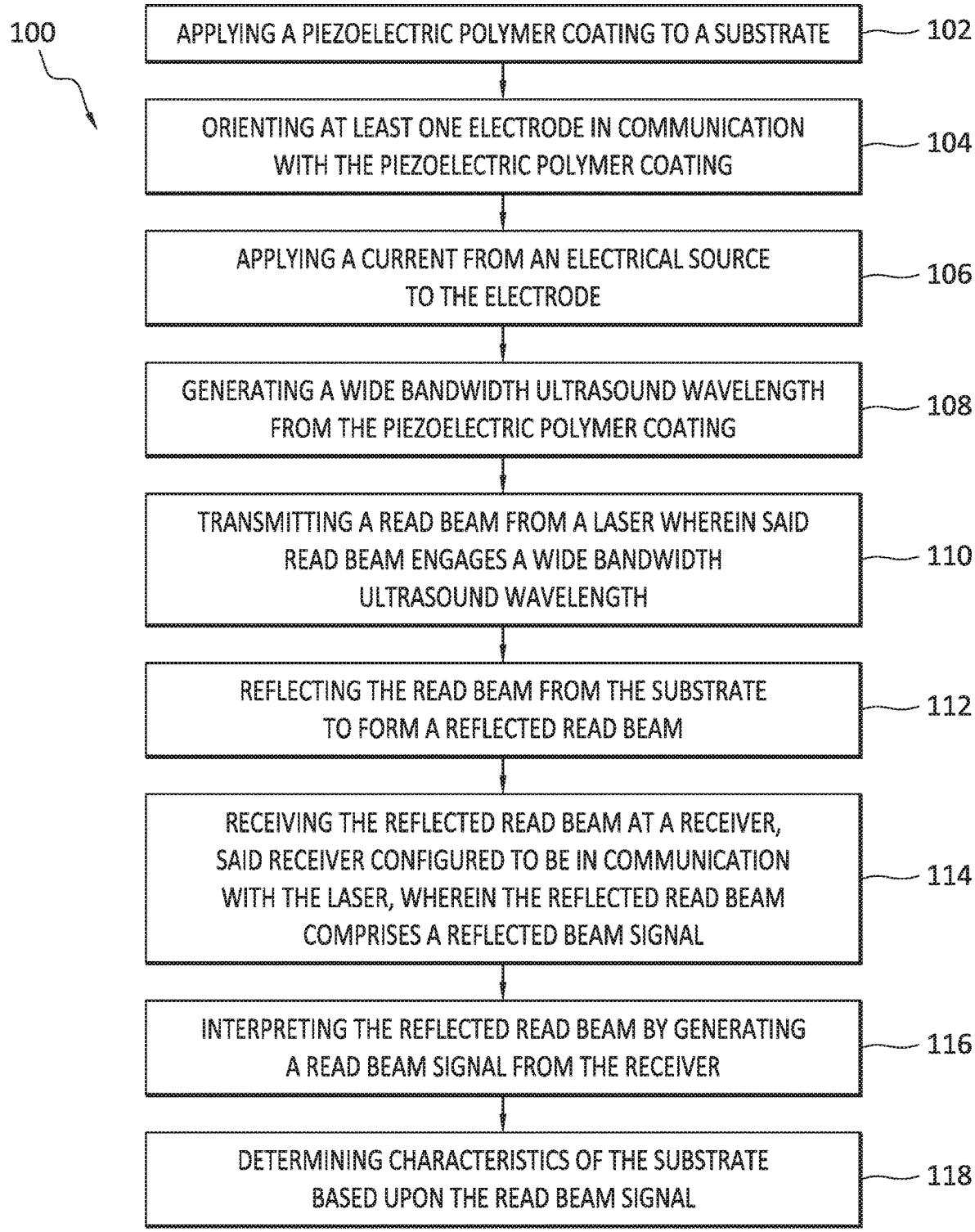
Figure 9:
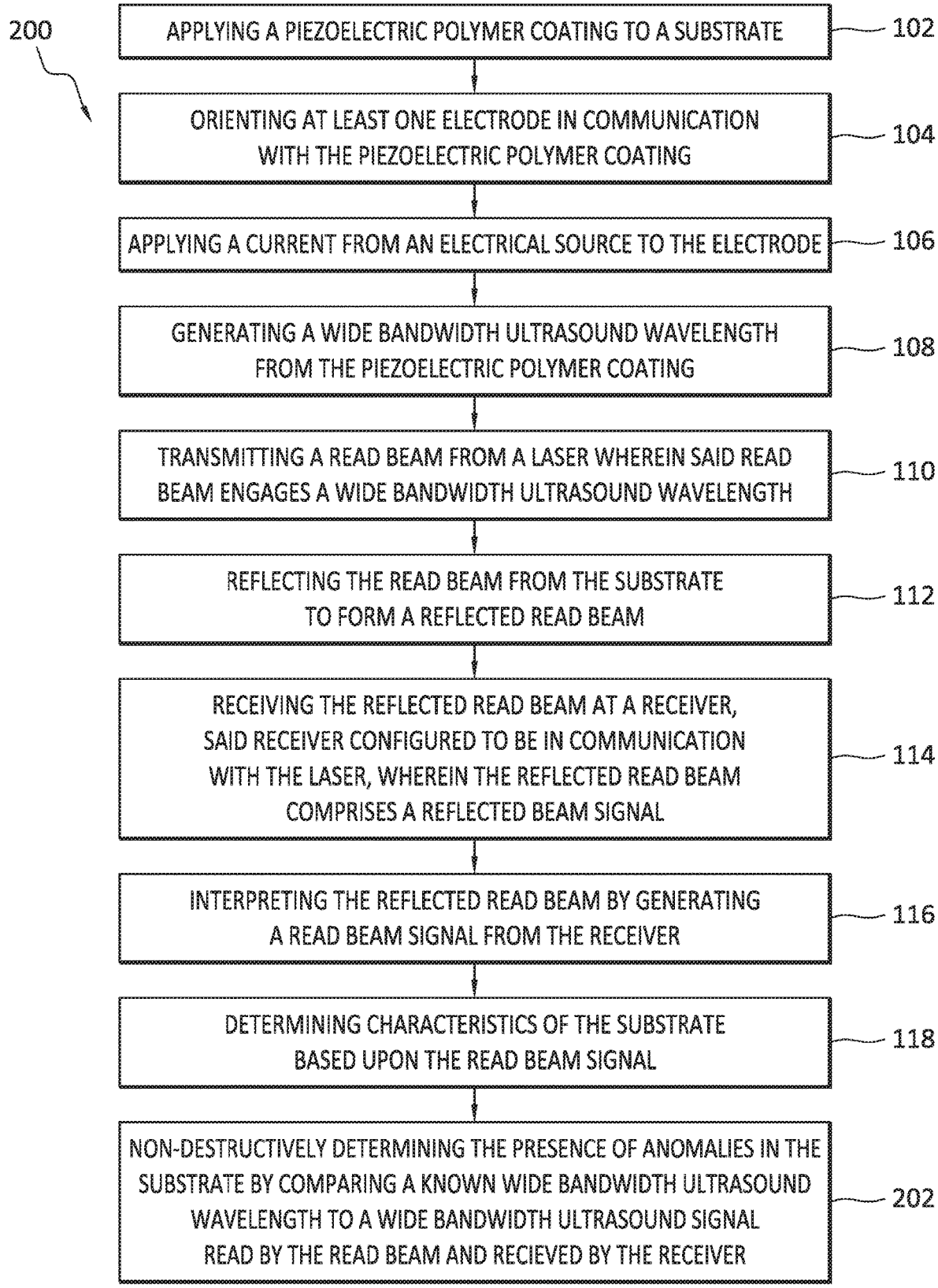
Figure 10:
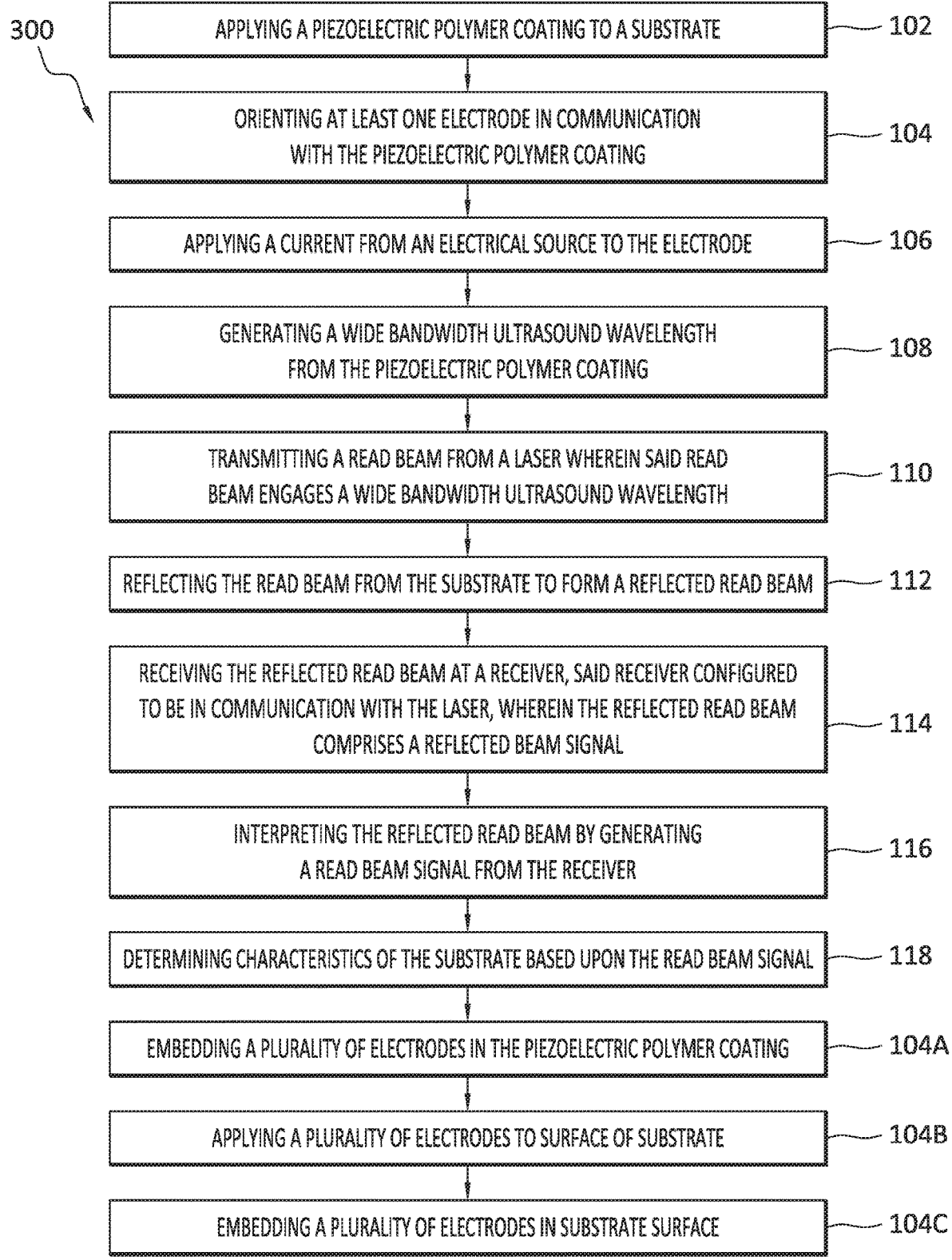

Having thus described variations of the disclosure in general terms, reference will now be made to the accompanying drawings, which are not necessarily drawn to scale, and wherein:

FIG. 1 is an illustration of an aspect of the present disclosure;

FIG. 2 is an illustration of an aspect of the present disclosure;

FIG. 3 is an illustration of an aspect of the present disclosure;

FIG. 4 is an illustration of an aspect of the present disclosure;

FIG. 5A is an illustration of an aspect of the present disclosure;

FIG. 5B is an illustration of an aspect of the present disclosure;

FIG. 6 is an illustration of a vehicle including a sub-assembly that can be non-destructively inspected according to an aspect of the present disclosure;

FIG. 7 is an illustration of sub-assemblies that can be non-destructively inspected according to a present aspect;

FIG. 8 is a flowchart outlining a method according to an aspect of the present disclosure;

FIG. 9 is a flowchart outlining a method according to an aspect of the present disclosure; and FIG. 10 is a flowchart outlining a method according to an aspect of the present disclosure.

DETAILED DESCRIPTION

According to present aspects, systems and methods for non-destructively inspecting substrates through the use ultrasonic energy, including the non-destructive inspection of structures that are difficult to access, or the non-destructive inspection of structures that have areas or regions on the structure that are difficult to access, and where non-destructive ultrasonic inspection methods and systems have previously provided unsatisfactory, inconclusive and/or unreliable results.

Present aspects are directed to cost-effective non-destructive testing methods, systems, and apparatuses using ultrasonic transducers for inspecting, for example, vehicles (e.g. aircraft, spacecraft, terrestrial vehicles, marine vehicles, etc.), bridges, trusses, rail vehicles, petrochemical structures that can include pipelines and pipes, etc.

Further present aspects disclose the generation and evaluation of wide bandwidth ultrasonic signals (e.g., ultrasonic signals generated via a piezoelectric transducer or transducing means) without the use of or need for a piezoelectric receiver that is ordinarily required and associated with the piezoelectric transducer. Wide bandwidth ultrasonic signals refer to wide bandwidth ultrasonic frequencies ranging from about 10 to about 200 MHz. An ultrasonic transducer is formed for the purpose of generating a signal followed by optically monitoring the emitting ultrasonic signal generated from the ultrasonic transducer. According to present aspects, by interpreting the differences between the generated ultrasonic signal and the ultrasonic signal that is reflected back from a target area of a target substrate (and optically monitored), characteristics of the target substrate can be perceived for the purpose of non-destructively detecting corrosion, cracks, delamination, residual stress, or other anomalies, etc. in the target substrate.

According to present aspects methods, systems, and apparatuses are disclosed for wideband ultrasonic inspection techniques using an ultrasonic transducer for generating wideband ultrasonic signals, with the ultrasonic transducer comprising a powered electrode residing in, applied to, or otherwise embedded in a piezoelectric polymer material. The methods, systems, and apparatuses further comprise optically monitoring reflected signals for the purpose of obviating the need for locating a piezoelectric receiver on the target surface proximate to the ultrasonic transducer (or otherwise contacting a target surface with a receiver of any kind). In this way, according to present aspects, a laser is used to send beams to the target surface to impact ultrasonic waves generated at the target surface, and then collect reflected beams from the target for the purpose of determining the Doppler effect via a non-contact Doppler velocity meter incorporated into, or in communication with the laser.

The Doppler velocity meter is referred to as a non-contact Doppler velocity meter recognizing that the Doppler velocity meter is located remotely, and at a distance from the target substrate and is not "in direct contact" with the substrate surface. Neither the Doppler velocity meter nor the laser (acting as the ultrasonic "receiver") are in contact with the substrate surface. The disclosed non-destructive inspection methods, systems, and apparatuses therefore only require the presence of a transducer element in contact with the substrate surfaces, with the receiver able to be located remotely from the substrate surface.

The data generated by the Doppler velocity meter is then interpreted to give information regarding the characteristics of the target for the purpose of identifying the presence of anomalies in the target surface or sub-surface including, but not limited to areas of disbond, delamination, corrosion, cracks, material stresses or material fatigue, etc.

According to present aspects, ultrasonic signals reflected from a target surface are evaluated optically using a non-contact Doppler velocity meter. The presently disclosed methods, systems, and apparatuses employ a predetermined number of small piezoelectric transducers that can be permanently and cost-effectively installed, embedded, or otherwise located along or within a substrate's area for the purpose of obtaining sound information remotely. Such presently disclosed systems, methods, and apparatuses obviate the need for the previously required and typically large and heavy piezoelectric transducers and typically large and heavy piezoelectric receivers.

The use of a Doppler velocity meter in conjunction with a laser for the purpose of receiving and interpreting a received laser "read" beam that is reflected from a substrate and/or a substrate surface allows for three types of wideband ultrasonic inspection, including: burst, impulse and "chip"

modes. Evaluating these three types of emitted ultrasonic effects allows for the detection of surface wave, resonant and Rayleigh wave type ultrasonic inspection of the characteristics and condition of a target substrate surface and target substrate sub-surface region through the evaluation of wide bandwidth, amplitude and displacement.

According to present aspects, the use of ultrasonic wide bandwidth transducers, measurements can be performed over a wide frequency band ranging from about 20 MHz to about 125 MHz that consequently yield dispersion curves over a wide frequency band.

According to present aspects, piezoelectric coating materials can be applied to (e.g., sprayed onto) a substrate surface, e.g., followed by drying or curing the piezoelectric coating material. Electrodes can be embedded or applied into or onto the piezoelectric coating material. When a voltage from a power source is provided to the electrodes (shown in the accompanying FIGs. as intermingled electrode fingers), an oscillating charge from the electrodes creates an electric field between each electrode "pair". The combination of the piezoelectric effect of the substrate (provided by the piezoelectric coating material) and the electric field generates oscillating expansions that, in turn, generate high frequency wide bandwidth ultrasound frequencies.

In an alternate configuration, and according to present aspects, electromagnetic elements can be incorporated into the piezoelectric coating material and energized to generate electromagnetic wave energy, with the electromagnetic field generating oscillating expansions that, in turn, generate high frequency wide bandwidth ultrasound frequencies.

Piezoelectricity is the electric charge accumulates in certain solid materials (such as crystals, certain ceramics, certain polymers, etc., in response to applied mechanical stress. The word "piezoelectricity" means electricity resulting from pressure and latent heat. The piezoelectric effect results from the linear electromechanical interaction between the mechanical and electrical states in crystalline materials. The piezoelectric effect is a reversible process; with materials exhibiting the piezoelectric effect (the internal generation of electrical charge resulting from an applied mechanical force), and also exhibiting the reverse piezoelectric effect, and the internal generation of a mechanical strain resulting from an applied electrical field. For example, lead zirconate titanate crystals will generate measurable piezoelectricity when their static structure is deformed by about 0.1% of the original dimension. Conversely, those same crystals will change about 0.1% of their static dimension when an external electric field is applied to the material. The inverse piezoelectric effect is used in the production of ultrasonic sound waves.

Families of ceramic materials with perovskite, tungsten-bronze; and related structures exhibit piezoelectricity including, for example, barium titanate ($BaTiO_3$); lead zirconate titanate ($Pb[Zr_xTi_{1-x}]O_3$ with $0 \le x \le 1$), more commonly known as PZT; potassium niobate ($KNbO_3$); sodium tungstate ($Na_2WO_3$), and others including, for example, $Ba_2NaNb_5O_5$, $Pb_2KNb_5O_{15}$.

While the piezoelectric response of polymers has been considered as being lower than the response for ceramics, piezoelectric polymers offer greater flexibility and smaller acoustical impedance, as well as providing piezoelectrical response at a lower cost and lower power consumption as compared to ceramic piezoelectric materials.

Piezoelectric polymers can be classified by bulk polymers, voided charged polymers, and polymer composites. Two types of bulk polymers include amorphous and semi-crystalline bulk polymers. Examples of semi-crystalline polymers include polyvinylidene fluoride (PVDF) and its copolymers and polyamides. Non-crystalline polymers include, for example, polyimide and polyvinylidene chloride (PVDC). Voided charged polymers exhibit the piezoelectric effect due to charge induced by poling of a porous polymeric film. Under an electric field, charges form on the surface of the voids forming dipoles. Electric responses can be caused by any deformation of these voids.

The piezoelectric effect can also be observed in polymer composites by integrating piezoelectric ceramic particles into a polymer film. A polymer need not be piezo-active to be an effective material for a polymer composite. In this case, a material could be made up of an inert matrix with a separate piezo-active component. For example, PVDF exhibits piezoelectricity several times greater than quartz.

Laser Doppler velocimetry is the technique of using the Doppler shift in a laser beam to measure the vibratory motion of opaque reflecting surfaces. Laser Doppler velocimetry works by crossing two beams of collimated, monochromatic and coherent laser light. The beams can be obtained by splitting a single beam. Useful lasers with wavelengths in the visible spectrum (e.g., 390 nm to 750 nm) can be used including, for example, He—Ne lasers, argon ion lasers, laser diode lasers, etc. According to present aspects laser Doppler velocimetry is used as an interferometer, with a sensor used to split a laser beam into two parts including a measurement beam and a reference beam. Receiving optics intersect the measurement beam such that small particles representing anomalies in a substrate will scatter light from the measurement beam and effect a Doppler shift that can then be measured as a portion of the scattered light is collected by receiving optics (e.g., a receiver) and transferred to a photodetector that can include interpreting software and hardware. The reference beam can also be sent to a photodetector to produce an electrical signal that is proportional to the Doppler shift for the purpose of detecting the presence of an anomaly in the substrate (e.g., a deformation, the presence of a contaminant, delamination, a crack, a fissure, a disbond, or other unwanted anomaly, etc.)

FIG. 1 is a representative illustration of interlocked or intermingled electrodes embedded in a piezoelectric material. As shown in FIG. 1, a substrate 10 includes a substrate surface 11 onto which is placed a piezoelectric polymer coating material 14. A first electrode 12a is shown positioned proximate to a second electrode 12b in an "intermingled" orientation. As shown in FIG. 1, and according to present aspects, the first electrode 12a and second electrode 12b are in contact with the piezoelectric polymer coating material. The first electrode 12a and second electrode 12b can be applied to the substrate surface 11, can be embedded into the substrate surface, or can be applied to or embedded in the piezoelectric polymer coating material.

The piezoelectric polymer coating material can be applied to the substrate as a film or the piezoelectric polymer coating material can be applied to the substrate surface in liquid form. As shown in FIG. 2, if the piezoelectric polymer coating material 14 is applied to the substrate surface as a liquid, such material can be dried or cured as required. In such present aspects, as shown in FIG. 2, a substrate 20, having a substrate surface 21 has an applied and cured piezoelectric polymer coating material with applied or embedded first electrode 12a and second electrode 12b, that can be embedded into or applied to the substrate surface 21 (e.g., prior to applying the piezoelectric polymer coating material) or that can be embedded or applied to the piezoelectric polymer coating mater pre-cure or post-cure.

FIG. 3 illustrate, in non-limiting fashion a further aspect. As shown in FIG. 3, a power source 34 is in communication with to first electrode 12a and second electrode 12b via leads 36. When the power source is actuated, voltage proceeds from the power source 34 vias the leads 36 to the first electrode 12a and second electrode 12b respectively. The first electrode 12a and second electrode 12b are shown embedded into or otherwise situated proximate to a piezoelectric polymer coating material 22 that has been applied to a substrate (not shown in FIG. 3) of the type shown in FIGS. 1 and 2. First electrode 12a and second electrode 12b are energized or "powered" to create an electric field for the purpose of energizing the piezoelectric polymer coating material 22, causing generation of sound waves 38 (shown as broken lines) emanating outwardly from the from the piezoelectric polymer coating material 22. A laser 40 is configured to perform the function of a wave detection apparatus 41 comprising or otherwise associating with and/or incorporating a Doppler velocity meter 41a.

Wave detection apparatus 41 further includes a laser emitting area 42 for emitting a beam 44 directed to a substrate surface for the purpose of engaging the substrate surface and the sound waves 38. Reflected beam 46 is directed back to the wave detection apparatus 41 to a receiver 48 that is oriented proximate to or is otherwise included in the wave detection apparatus 41. It is understood that the system shown in FIG. 3, when in operation, uses the aspects shown in FIGS. 1 and/or 2.

FIG. 4 shows a non-limiting schematic diagram according to further aspects. As shown in FIG. 4, a system 50 for non-destructively inspecting a substrate that includes a substrate surface and a substrate sub-surface includes a signal generator 52 in communication with an oscillator 54 that are both in communication with a power supply 56. The power supply 56 is in further in communication with a first electrode 12a via lead 56b and power supply 56 is further in communication with second electrode 12b via lead 56a. As further shown in FIG. 4, a piezoelectric polymer coating material is in contact with a substrate (not shown in FIG. 4) with the first electrode 12a and second electrode 12b respectively embedded into the piezoelectric polymer coating material. When system 50 is engaged, first electrode 12a and second electrode 12b are powered and create an electric field that energized the piezoelectric polymer coating material 22 and generates sound waves 38 that are sensed by emitting beam 62 of laser 60. Reflected beam 64 is reflected from the sound waves 38 and received by receiver 66 that is in communication with Doppler velocity meter 67 that sends a signal to signal analyzer 68. The system 59 is controlled via a synchronization circuit in controller 70.

FIG. 6 is a non-limiting illustration of a vehicle 90 in the form of an aircraft. including a fuselage 92. FIG. 7 is a non-limiting illustration of a fuselage interior 92a of fuselage 92 showing frames 94 and stringers 96. According to present aspects, exterior stringer surfaces 96a of stringers 96 can include the piezoelectric polymer coating materials and embedded or applied electrodes shown in FIGS. 1, 2, 3 and/or 4.

The present application further discloses a method according to a present aspect for non-destructively inspecting a substrate, including measuring the Doppler effect in response to applied ultrasonic forces As shown in FIG. 8, a method 100 includes applying 102 a piezoelectric polymer coating to a substrate, orienting 104 at least one electrode in communication with the piezoelectric polymer coating, applying 106 a current from an power source (e.g. an electrical source, etc.) to the electrode, and generating 108 a wide bandwidth ultrasound wavelength from the piezoelectric polymer coating. The method further includes transmitting 110 a read beam from a laser, with the laser positioned remotely at a predetermined distance away from the substrate, and wherein the read beam engages the wide bandwidth ultrasound wavelength. The method further includes reflecting 112 the read beam from the substrate to form a reflected read beam, receiving 114 the reflected read beam at a receiver, with the receiver configured to be in communication with the laser, and wherein the reflected read beam comprises a reflected read beam signal, interpreting 116 the reflected read beam by generating a read beam signal from the receiver; and determining 118 characteristics of the substrate based upon the reflected read beam signal.

In another aspect, the receiver comprises or is otherwise in communication with a Doppler velocity meter.

In a further aspect, as shown in FIG. 9, a presently disclosed method 200 further includes non-destructively determining 202 the presence of anomalies in the substrate by comparing a known wide bandwidth ultrasound wavelength to a wide bandwidth ultrasound signal read by the read beam and received by the receiver and measuring the Doppler effect.

In another aspect, the methods outlined in FIGS. 8 an/or 9, in the step of orienting 102 at least one electrode in communication with the piezoelectric polymer material, the method further includes applying a plurality of electrodes to the surface of the substrate, with the plurality of electrodes in communication with the piezoelectric polymer coating.

In another aspect, as shown in FIGS. 8 and/or 9, in the step of orienting 102 at least one electrode in communication with the piezoelectric polymer material, the method further includes embedding a plurality of electrodes in the surface of the substrate.

In other aspect, as shown in FIG. 10, a method 300 includes applying 102 a piezoelectric polymer coating to a substrate, orienting 104 at least one electrode in communication with the piezoelectric polymer coating, applying 106 a current from a power source (e.g. an electrical source, etc.) to the electrode, and generating 108 a wide bandwidth ultrasound wavelength from the piezoelectric polymer coating. The method further includes transmitting 110 a read beam from a laser, with the laser positioned remotely at a predetermined distance away from the substrate, and wherein the read beam engages the wide bandwidth ultrasound wavelength. The method further includes reflecting 112 the read beam from the substrate to form a reflected read beam, receiving 114 the reflected read beam at a receiver, with the receiver configured to be in communication with the laser, interpreting 116 the reflected read beam by generating a reflected read beam signal from the receiver, determining 118 characteristics of the substrate based upon the read beam signal, and embedding a plurality of electrodes in the piezoelectric polymer coating material.

Any of the methods outlined in FIGS. 8, 9, and/or 10 further contemplated employing the systems and apparatuses shown in any of FIG. 1, 2, 3, 4, 5A, 5B, 6, or 7.

Aspects of the present disclosure may, of course, be carried out in other ways than those specifically set forth herein without departing from essential characteristics of the present application. The present aspects are to be considered in all respects as illustrative and not restrictive, and all changes coming within the meaning and equivalency range of the appended claims are intended to be embraced therein.

What is claimed is:

1. A method for non-destructively inspecting a substrate comprising:
   applying a piezoelectric polymer coating material to a substrate, said substrate comprising a substrate surface;
   orienting at least one electrode pair in communication with the piezoelectric polymer coating material;
   applying a current from a power source to the at least one electrode pair;
   generating ultrasound waves from the piezoelectric polymer coating material to form generated ultrasound waves, said generated ultrasound waves comprising wide bandwidth ultrasound wavelengths, said generated ultrasound waves comprising a generated ultrasound signal;
   transmitting a laser read beam from a laser, said laser positioned remotely from the substrate at a predetermined distance away from the substrate, and wherein said laser read beam engages the generated ultrasound waves;
   reflecting the laser read beam from the substrate to form a reflected laser read beam;
   receiving the reflected laser read beam at a receiver, said receiver configured to be in communication with the laser, wherein the reflected laser read beam comprises a reflected laser beam signal;
   interpreting the reflected laser read beam by generating a laser read beam signal from the receiver; and
   determining a characteristic of the substrate based upon the reflected laser read beam signal.

2. The method of claim 1, wherein the receiver is in communication with a Doppler velocity meter, and the method further comprising:
   determining a characteristic of the substrate based upon an amount of Doppler shift in the laser read beam compared to the reflected laser read beam measured by the Doppler velocity meter.

3. The method of claim 1, further comprising:
   non-destructively determining a presence of anomalies in the substrate.

4. The method of claim 1 wherein the laser comprises at least one of: a He-Ne laser, an argon laser, a laser diode laser; or combinations thereof.

5. The method of claim 1, wherein the piezoelectric polymer coating material comprises at least one of: lead zirconate titanate; polyvinylidene fluoride; polyimide; polyvinylidene chloride; potassium niobate; sodium tungstate; or combinations thereof.

6. The method of claim 1, further comprising:
   embedding a plurality of electrode pairs in the piezoelectric polymer coating material.

7. The method of claim 1, further comprising:
   positioning a plurality of electrode pairs at the substrate surface, said plurality of electrode pairs in communication with the piezoelectrical polymer coating material.

8. The method of claim 1, further comprising:
   embedding a plurality of electrode pairs in the substrate surface.

9. The method of claim 1, wherein the substrate comprises at least one of: a composite material; a metallic material, a non-metallic material; or combinations thereof.

10. The method of claim 1, wherein the receiver is located remotely from the substrate surface.

11. The method of claim 1, wherein the receiver is incorporated into an apparatus comprising the laser.

12. The method of claim 1, further comprising:
    non-destructively inspecting the substrate; and
    wherein the characteristic of the substrate is a substrate anomaly.

13. A system for non-destructively inspecting a substrate, the system comprising:
    a substrate comprising a substrate surface;
    a piezoelectric polymer coating material on the substrate surface;
    at least one electrode pair in communication with the piezoelectric polymer coating material;
    a power source in communication with the at least one electrode pair, said power source configured to deliver power to the electrode pair, to form a powered electrode pair, said powered electrode pair configured to interact with the piezoelectric polymer coating material to generate wideband ultrasonic waves;
    a laser located a predetermined distance from the substrate, said laser comprising:
       a laser energy source;
       a laser emitting area for emitting a laser read beam, said laser configured to direct the laser read beam to the substrate, said laser read beam configured to contact and read the ultrasonic waves; and
    a receiver for receiving a reflected laser read beam from the substrate.

14. The system of claim 13, wherein the substrate is at least one of: a composite material; a metallic material; a non-metallic material; or combinations thereof.

15. The system of claim 13, wherein the receiver is in communication with a Doppler velocity meter.

16. The system of claim 13, wherein the laser comprises at least one of: a He-Ne laser, an argon laser, a laser diode laser; or combinations thereof.

17. The system of claim 13, wherein the piezoelectric polymer coating material comprises at least one of: lead zirconate titanate; polyvinylidene fluoride;
    polyimide; polyvinylidene chloride; potassium niobate; sodium tungstate; or
    combinations thereof.

18. The system of claim 13, wherein the at least one electrode pair is embedded in the piezoelectric polymer coating material.

19. The system of claim 13, wherein the at least one electrode pair is embedded in the substrate, and wherein the at least one electrode pair is further in communication with the piezoelectric polymer coating material.

20. The system of claim 13, wherein the laser is configured to detect a wide bandwidth ultrasound wave from the substrate.

21. The system of claim 13, wherein the laser comprises a receiver configured to receive a laser read beam that detects the wide bandwidth ultrasound wave, said receiver further configured to be located remotely at a predetermined distance away from the substrate.

* * * * *